(12) United States Patent
Daus

(10) Patent No.: US 11,536,067 B2
(45) Date of Patent: Dec. 27, 2022

(54) SPRING ARRAY AND METHOD FOR DOOR COUNTERBALANCING

(71) Applicant: Overhead Door Corporation, Lewisville, TX (US)

(72) Inventor: Mark Daus, Doylestown, OH (US)

(73) Assignee: OVERHEAD DOOR CORPORATION, Lewisville, TX (US)

(*) Notice: Subject to any disclaimer, the term of this patent is extended or adjusted under 35 U.S.C. 154(b) by 760 days.

(21) Appl. No.: 16/459,277

(22) Filed: Jul. 1, 2019

(65) Prior Publication Data
US 2021/0002934 A1  Jan. 7, 2021

(51) Int. Cl.
E05D 13/00 (2006.01)
E06B 9/60 (2006.01)
F03G 1/02 (2006.01)
F16H 1/28 (2006.01)
F03G 1/08 (2006.01)

(52) U.S. Cl.
CPC ..... E05D 13/1215 (2013.01); E05D 13/1238 (2013.01); E06B 9/60 (2013.01); F03G 1/02 (2013.01); F03G 1/08 (2013.01); F16H 1/28 (2013.01); E05Y 2201/484 (2013.01); E05Y 2900/106 (2013.01); E05Y 2900/132 (2013.01); F03G 1/026 (2021.08)

(58) Field of Classification Search
CPC ... E05D 13/1215; E05D 13/1238; E06B 9/60; F03G 1/02; F03G 1/08; F03G 1/026; F16H 1/28; E05Y 2201/484; E05Y 2900/106; E05Y 2900/132

USPC ........................................................ 160/317
See application file for complete search history.

(56) References Cited

U.S. PATENT DOCUMENTS

| | | | | |
|---|---|---|---|---|
| 5,636,678 A * | 6/1997 | Carper | ................ | E05D 13/1269 16/DIG. 7 |
| 5,865,235 A * | 2/1999 | Krupke | ................ | E05D 13/1261 160/201 |
| 5,964,268 A * | 10/1999 | Carper | ................ | E05D 13/1261 16/DIG. 7 |
| 6,327,744 B1 * | 12/2001 | Dorma | ...................... | E06B 9/60 16/197 |
| 6,742,564 B2 * | 6/2004 | Martin | .................. | E05D 15/246 160/188 |
| 7,128,123 B2 * | 10/2006 | Mullet | .................. | E05D 15/246 160/209 |

(Continued)

*Primary Examiner* — Beth A Stephan
(74) *Attorney, Agent, or Firm* — Haynes and Boone, LLP

(57) ABSTRACT

A system for exerting torque on a shaft includes: a spring assembly having; a spring; a companion member to the spring, wherein at least one of the spring and the companion member is in compression and the other of the spring and companion member is in tension; connecting structure for transmitting a force associated with the spring outside of the gear assembly; and a gear train for connecting the connecting structure to the shaft to apply torque to the shaft. A method of exerting torque on a shaft includes: arranging a plurality of spring assemblies arranged in an array around the shaft, each spring assembly having; a spring; connecting structure for transmitting a force associated with the spring; attaching a gear train to the connecting structure; and configuring the gear train to apply the force associated with the spring to the shaft in the form of torque on the shaft.

20 Claims, 9 Drawing Sheets

(56) References Cited

U.S. PATENT DOCUMENTS

| | | | | |
|---|---|---|---|---|
| 7,234,502 B2* | 6/2007 | O'Malley | ............ | E05D 13/1261 |
| | | | | 49/200 |
| 7,607,263 B2* | 10/2009 | Mullet | ................ | E05D 13/1261 |
| | | | | 160/188 |
| 7,737,654 B2* | 6/2010 | Anderson | ............. | E05F 15/681 |
| | | | | 318/470 |
| 8,375,635 B2* | 2/2013 | Hellinga | ................ | E05D 15/24 |
| | | | | 160/188 |
| 8,528,622 B2* | 9/2013 | Ehrlich | ............... | E05D 13/1261 |
| | | | | 160/209 |
| 9,234,377 B2* | 1/2016 | Schatz | ...................... | E06B 3/44 |
| 9,487,984 B2* | 11/2016 | Wachtell | ............. | E05D 13/1261 |
| 10,000,960 B2* | 6/2018 | Angiuli | ................... | E05F 15/40 |
| 10,718,149 B2* | 7/2020 | Liu | ........................ | B66D 1/14 |
| 2007/0200519 A1* | 8/2007 | Murphy | ................ | E05F 15/686 |
| | | | | 318/280 |
| 2007/0215292 A1* | 9/2007 | Mullet | ................ | E05D 13/1261 |
| | | | | 160/189 |
| 2011/0314649 A1* | 12/2011 | Kicher | ................... | B25B 27/30 |
| | | | | 29/227 |
| 2013/0314019 A1* | 11/2013 | Wilmes | ............... | E05D 13/1261 |
| | | | | 318/470 |
| 2014/0318719 A1* | 10/2014 | Hsieh | ....................... | E06B 9/42 |
| | | | | 160/133 |
| 2015/0083348 A1* | 3/2015 | Szczygielski | ......... | E06B 9/0638 |
| | | | | 160/190 |
| 2021/0310294 A1* | 10/2021 | Lindley | ................ | E05F 15/686 |
| 2021/0396059 A1* | 12/2021 | Hall | ..................... | E05F 15/686 |

\* cited by examiner

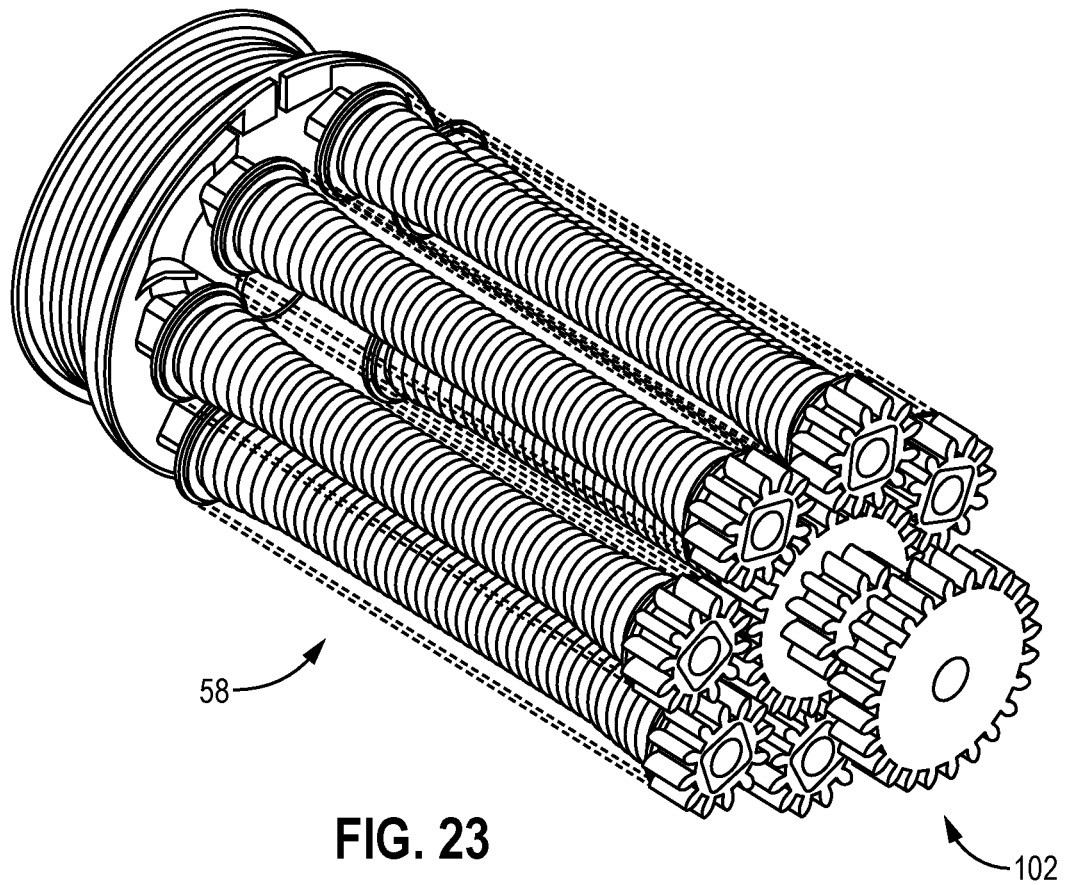
FIG. 23
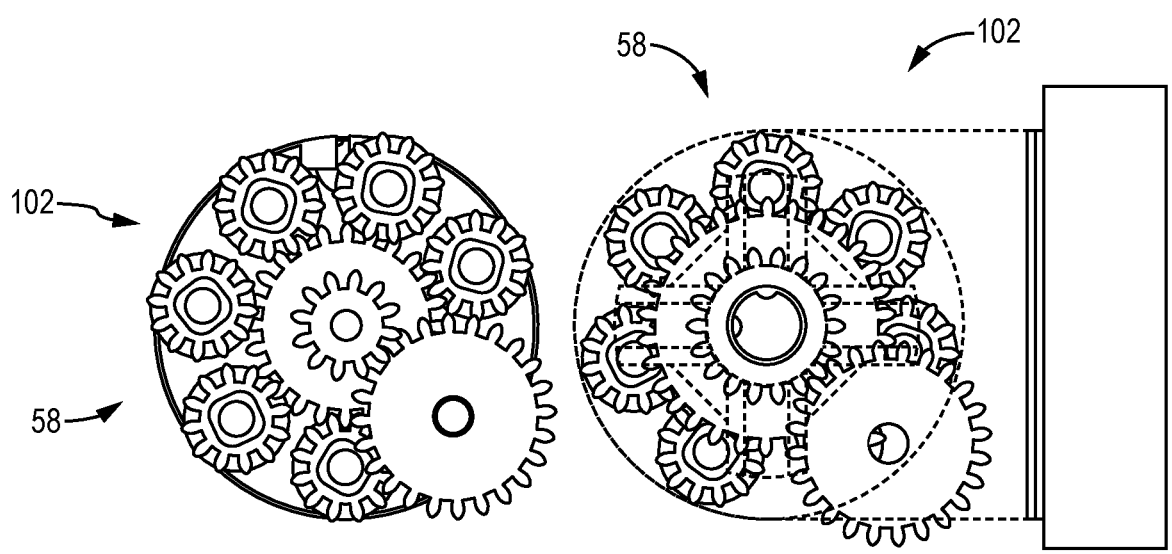
FIG. 24  FIG. 25

SPRING ARRAY AND METHOD FOR DOOR COUNTERBALANCING

TECHNICAL FIELD

This patent disclosure relates generally to a counterbalance system for an upward acting door and, more particularly, to a counterbalance system using an array of spring assemblies.

BACKGROUND

Upward acting doors such as, but not limited to, garage doors ride along a track system to open and close. Often the doors are heavy and a counterbalance system is used to make it easier to open and/or close the door. A shaft used as part of the counterbalance system may have a drum attached to the shaft. A cable is attached to the drum and the door. When the door is closed, the cable is spooled off of the drum, and when the door is opened, the cable is wound onto the drum. The cable is in tension to exert an upward force on the door to counter the weight of the door. Springs are attached to the shaft to impart a torque on the shaft to twist the shaft (and thus also the drum). It is this torque originating from the springs that is imparted to the shaft that puts the cable under tension to exert an upward force on the door.

Because doors vary greatly in size and weight, typical counterbalance systems use springs of various sizes and spring constants to achieve a desired amount of counterbalance for a particular door. Having to have on hand springs of various sizes and spring constants may be cumbersome for an installer. Further, some heavy doors may require large springs that are ungainly in size and/or shape. There may not always be room in a garage or other space hosting an upward acting door for awkwardly sized springs. In view of these challenges, it would be desirable to have a counterbalance system that could be compact and/or make use of standard spring sizes and/or reduces a number of spring sizes and/or constants to achieve a desired amount of counterbalancing for a variety of doors.

SUMMARY

The foregoing needs are met to a great extent by embodiments in accordance with the present disclosure, which, in some embodiments describe a counterbalance system that imparts torque on a shaft. The shaft is operably coupled to an upward acting door and the weight of the door imparts a torque on the shaft in a direction opposite to torque imparted on the shaft from the counter balance system. In effect, the counterbalance system helps to mitigate the weight of the door to allow easier opening and closing of the door.

In one aspect, the disclosure describes a system for exerting torque on a shaft. The system includes: a spring assembly having; a spring; a companion member to the spring, wherein at least one of the spring and the companion member is in compression and the other of the spring and companion member is in tension; connecting structure for transmitting a force associated with the spring outside of the gear assembly; and a gear train for connecting the connecting structure to the shaft to apply torque to the shaft.

In another aspect, the disclosure describes a system for exerting torque on a shaft. The system includes: a plurality of spring assemblies arranged in an array around the shaft, each spring assembly having; a spring; connecting structure for transmitting a force associated with the spring; and a gear train for connecting the connecting structure to the shaft and configured to apply the force associated with the spring to the shaft in the form of torque on the shaft.

The disclosure also provides, in another aspect, a method of exerting torque on a shaft. The method incudes: arranging a plurality of spring assemblies in an array around the shaft, each spring assembly having; a spring; connecting structure for transmitting a force associated with the spring; attaching a gear train to the connecting structure; and configuring the gear train to apply the force associated with the spring to the shaft in the form of torque on the shaft.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Additional features, advantages, and aspects of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate aspects of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings:

FIG. 23 is a partial perspective view of a counterbalance system.

FIG. 24 is a side view of an example gear train.

FIG. 25 is a side view where the mounting bracket is in phantom lines to show an example gear train.

FIGS. 30-44 are side schematic views showing example spring assembly arrangements.

DETAILED DESCRIPTION

Figure 1:
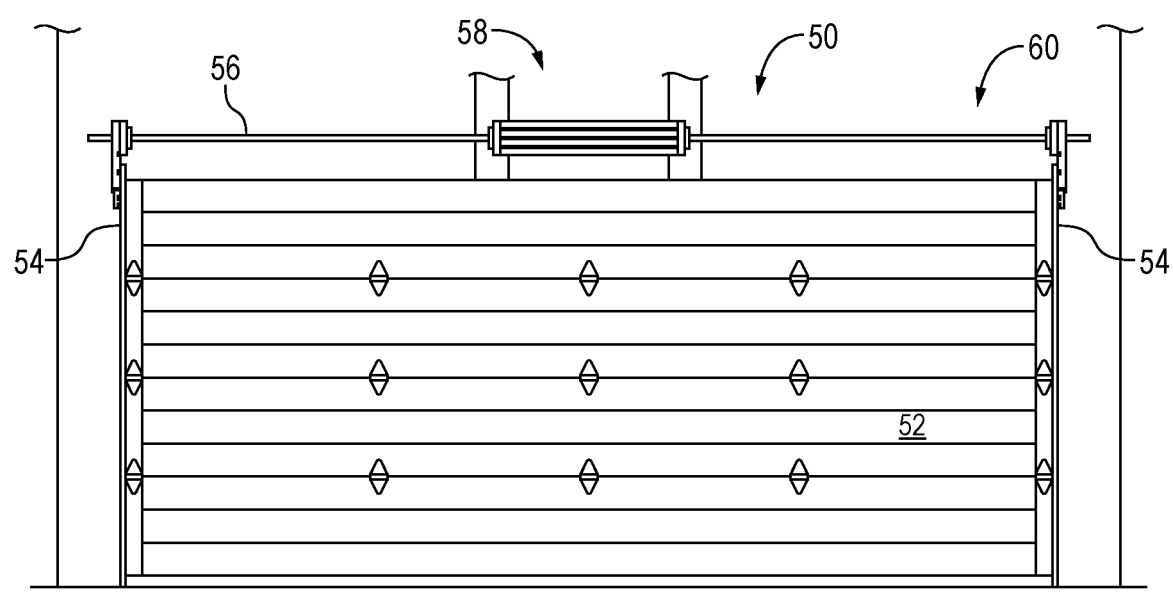
FIG. 1 is a rear view of a door system installed in a garage in accordance with the present disclosure.

The aspects of the disclosure and the various features and advantageous details thereof are explained more fully with reference to the non-limiting aspects and examples that are described and/or illustrated in the accompanying drawings and detailed in the following description. It should be noted that the features illustrated in the drawings are not necessarily drawn to scale, and features of one aspect may be employed with other aspects as the skilled artisan would recognize, even if not explicitly stated herein. Descriptions of well-known components and processing techniques may be omitted so as to not unnecessarily obscure the aspects of the disclosure. The examples used herein are intended merely to facilitate an understanding of ways in which the disclosure may be practiced and to further enable those of skill in the art to practice the aspects of the disclosure. Accordingly, the examples and aspects herein should not be construed as limiting the scope of the disclosure, which is defined solely by the appended claims and applicable law. Moreover, it is noted that like reference numerals represent similar parts throughout the several views of the drawings.

FIG. 1 shows an upward acting door system 50. The upward acting door system 50 shown is a segmented garage door 52. In other embodiments, other types of upward acting doors 52 may be used as part of the upward acting door system 50. As shown in FIG. 1, the upward acting door 52 moves along tracks 54. A door shaft 56 is mounted above the upward acting door 52 and is part of a counterbalance system 58 for counterbalancing the door 52. The door system 50 shown in FIG. 1 is located in a garage 60. However, the door system 50 in accordance with the present disclosure can be used in other facilities such as warehouses, distribution centers, factories, shops, or other commercial, private, or domestic applications.

Figure 2:
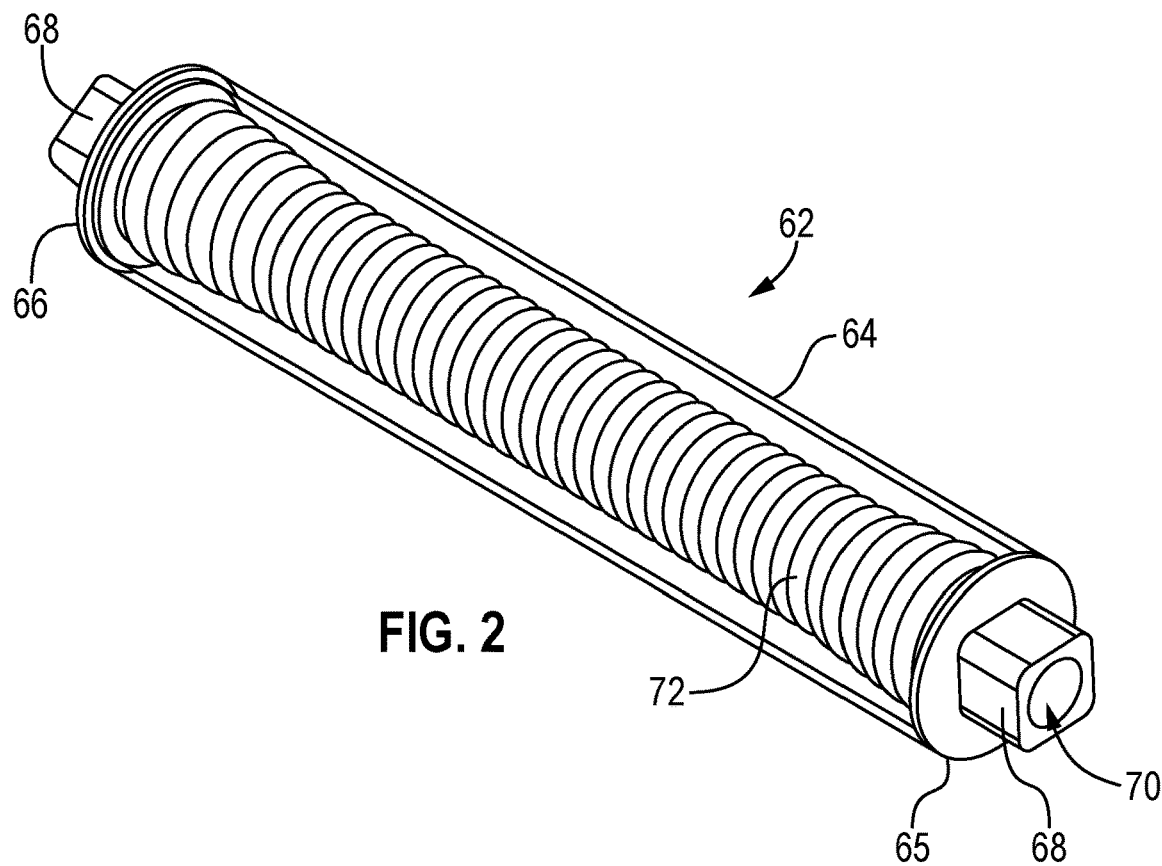
FIG. 2 is a perspective view of a spring assembly.

The counterbalance system 58 includes a plurality of spring assemblies 62 as shown in FIG. 2. The spring assembly 62 includes a companion member such as an outer housing 64, spring end covers 65, end projections 68 that extend through holes 70 in the spring end cover 65 and a spring 72. The end projections 68 are part of an end plug 74 (shown in FIGS. 3 and 4). In the spring assembly 62 shown in FIG. 2, the spring 72 is in tension and the outer housing 64 is in compression. The tension of the spring 72 imparts a torque on the end projections 68.

In other embodiments, the forces could be reversed where the outer housing 64 is in tension and the spring 72 is in compression. Still other embodiments may not use an outer housing 64 but may be configured to have the spring impart a torque outside the spring assembly 62. For example, rather than an outer casing, some embodiments may use a different companion member such as a rod located along (or even in) the spring 72 or other companion member that is in compression along with the tensioned spring 72. In still other embodiments, the spring 72 may be in compression and the companion member, such as a rod, casing or other companion member may be in tension. This can be done if the spring 72 is wound with gaps between the coils. In still other embodiments one end of the spring may float laterally. Other embodiments may use other ways or configurations to generate torque from a spring assembly 62.

Figure 3:
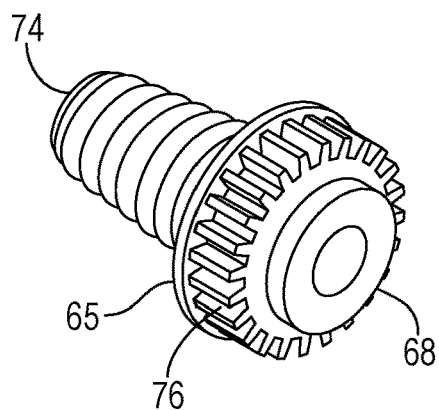
FIG. 3 is a perspective view of an end plug and gear.
Figure 4:
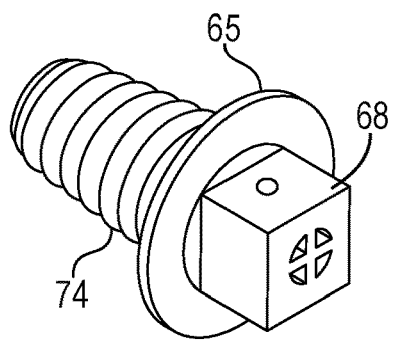
FIG. 4 is a perspective view of an end plug, end plate, and end projection.

FIGS. 3 and 4 show end plugs 74 where the outer projections 68 extend through the spring end covers 65. While some embodiments use end covers 65 it will be appreciated that other embodiments may use end plates 66. In some embodiments, the term end plate 66 is or can include the end cover 65. In FIG. 3, the end projection 68 is circular and serves and as an axle for a gear 76. The end plug shown in FIG. 4 has an end projection 68 that is square shaped. It is anticipated that in some embodiments one end of a spring assembly 62 (as shown in FIG. 2) will have an end plug 74 similar to that shown in FIG. 4 and will be fixed in place, and the other end of the spring assembly 62 will have an end plug 74 equipped with a gear 76 similar to what is shown in FIG. 3. The end plug 74 equipped with a gear 76 will be able to rotate and thereby transmit torque associated with the spring out of the spring assembly 62.

Figure 5:
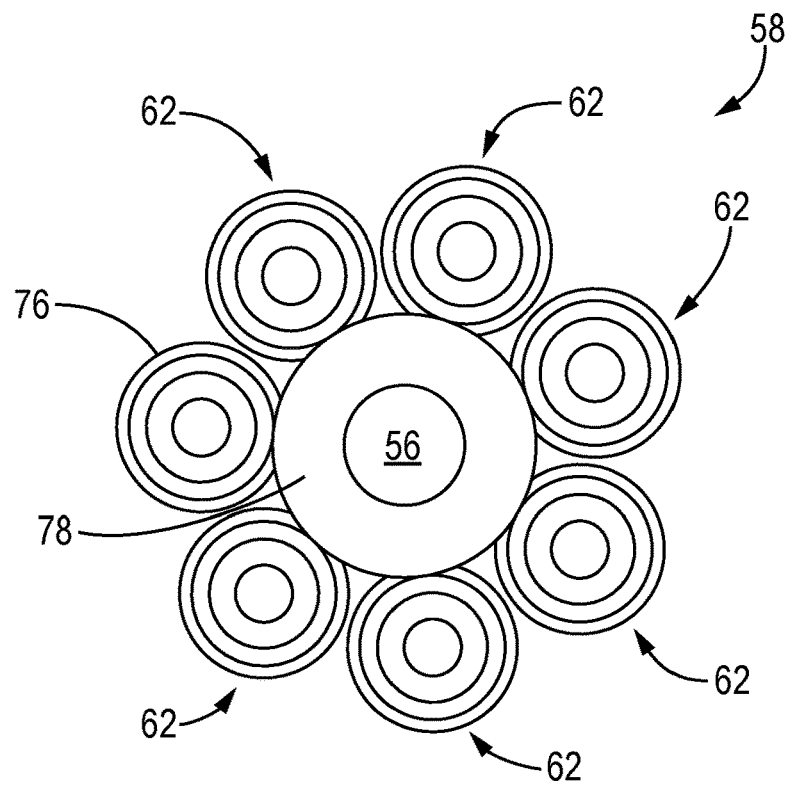
FIG. 5 is an end view of several spring assemblies.

FIG. 5 is a schematic end view of a counterbalance system 58 showing an example arrangement of multiple spring assemblies 62 arranged in an annular array around the door shaft 56. The gears 76 associated with each spring assembly 62 are meshed with and configured to transfer torque to the main gear 78 which is attached to the door shaft 56. In this manner, torque from the springs 72 (not shown in FIG. 5) is transmitted to the door shaft 56.

Figure 6:
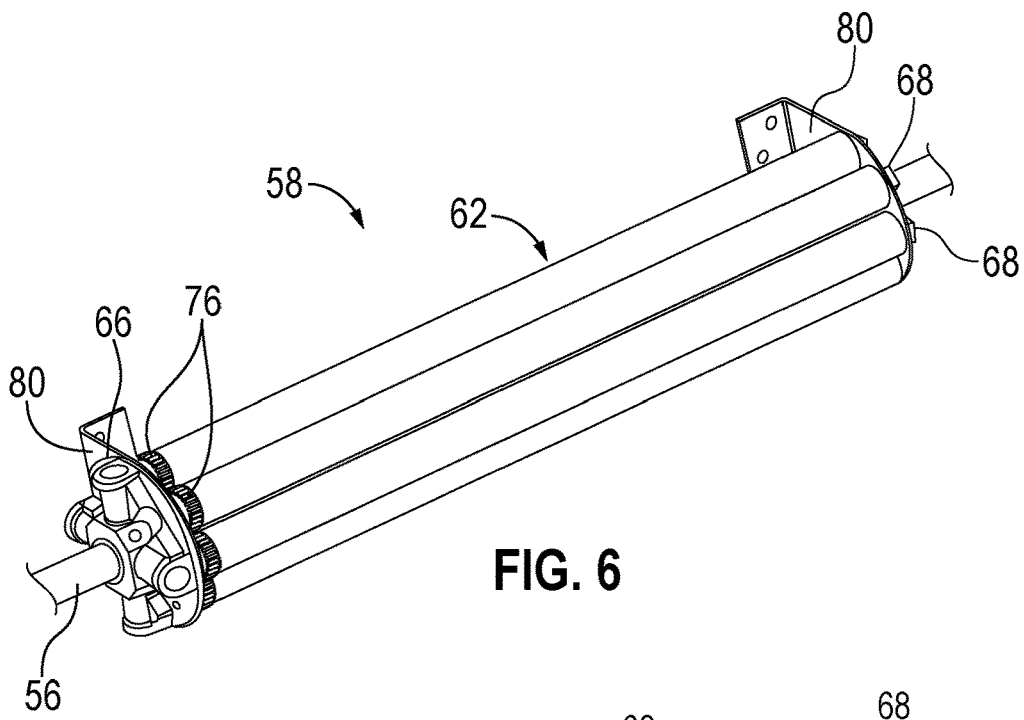
FIG. 6 is a perspective view of a counterbalance system in accordance with the present disclosure.

FIG. 6 shows an end plate 66 attached to a mounting bracket 80. The mounting bracket 80 is used to attach the counterbalance system 58 including the door shaft 56 spring assemblies 62 to a structure such as a wall. The gears 76 are shown at one end of the spring assemblies 62 while the end projections 68 are shown in a fixed position and exiting through the mounting bracket 80 at the other end of the spring assemblies 62.

Figure 7:
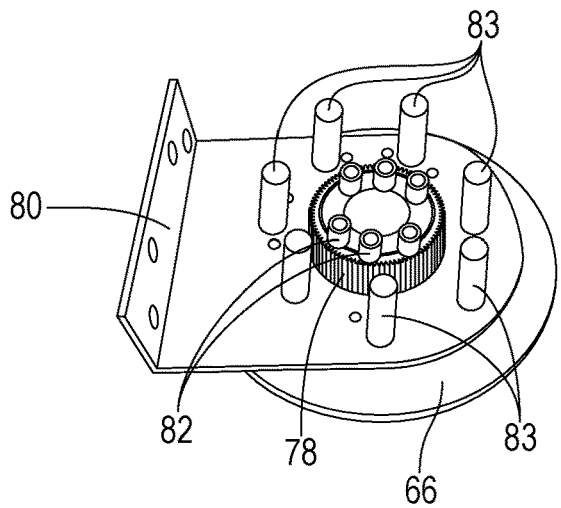
FIG. 7 is a perspective view of an end plate, main gear and mounting bracket.

FIG. 7 shows the other side of the mounting bracket 80 than what is seen in FIG. 6. The main gear 78 is shown with gear bolts 82 attaching to the main gear 78. Axles 83 for the gears 76 (not shown in FIG. 7) are attached to (or in some embodiments extent though the) mounting bracket 80.

Figure 8:
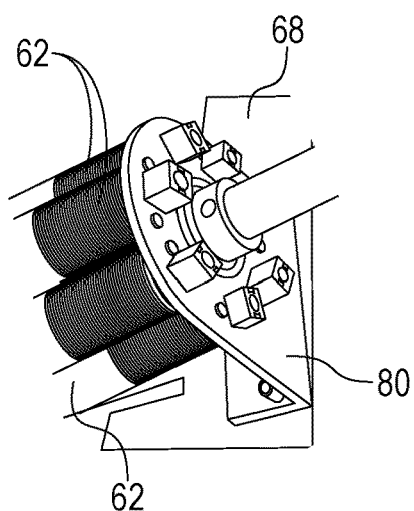
FIG. 8 is a perspective view of a counterbalance system attached to a mounting bracket.

FIG. 8 shows the spring assemblies 62 attached to the mounting bracket 80 with the end projections extending though the mounting bracket 80.

Figure 9:
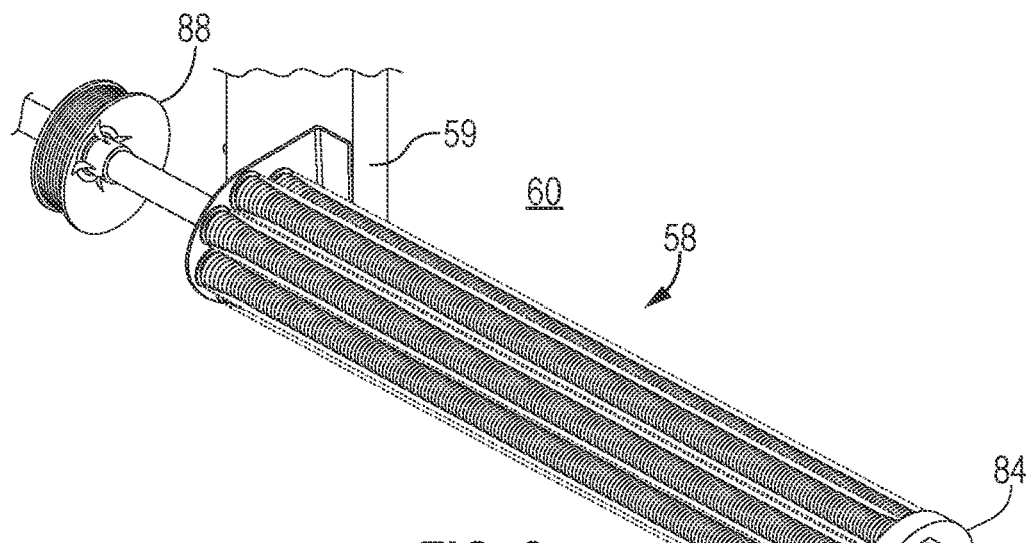
FIG. 9 is a perspective view of a counterbalance system with the outer housing removed.

FIG. 9 shows a counterbalance system 58 with a cable drum 88 mounted to the door shaft 56. The counterbalance system 58 is mounted via a mounting bracket 80 to a wall 59 in a garage 60. The gear train also known as a gear assembly 102 is obscured by the gear housing 84.

Figure 10:
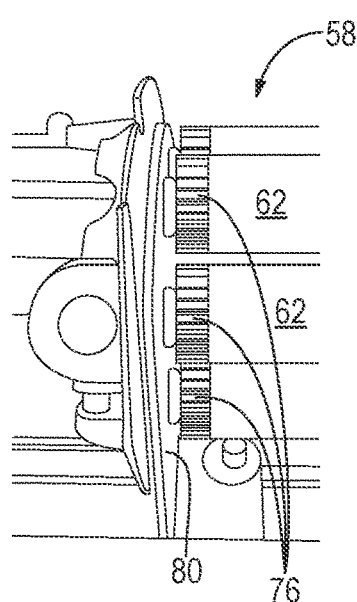
FIG. 10 is a perspective view of a portion of a gear train in accordance with the present disclosure.

FIG. 10 is a partial side view of a counterbalance system 58 showing the spring assemblies 62 along with gears 76. The gears 76 and spring assemblies 62 are attached to a mounting bracket 80.

Figure 11:
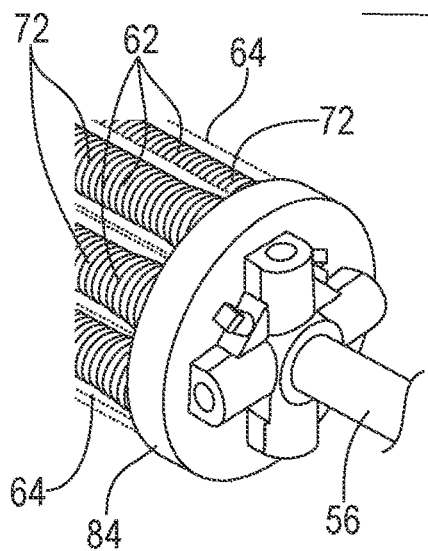
FIG. 11 is a partial perspective view of one end of a counterbalance system with the outer housing removed.

FIG. 11 illustrates a gear housing 84 which hides the gear assembly 102. The main gear 78 is attached to the door shaft 56 while the gears 76 from each spring assembly 62 are meshed with the main gear 78 in order to impart torque from the springs 72 from each spring assembly 62 to the main gear 78 and thereby to the door shaft 56. The gear assemblies 62 have the outer housing 64 drawn in a transparent manor or with phantom lines to show the springs 72.

Figure 12:
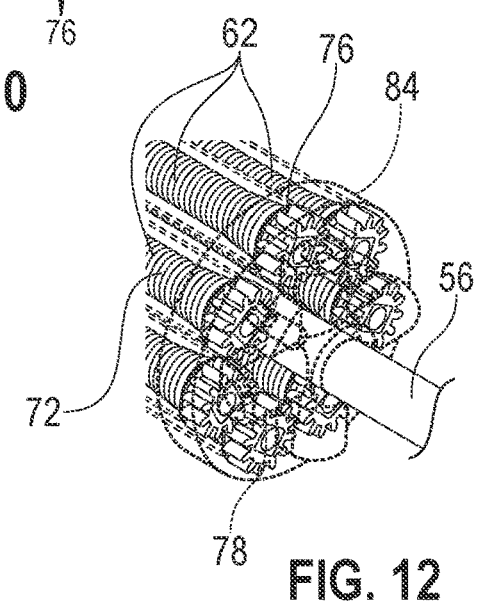
FIG. 12 is a partial perspective view of one end of a counterbalance system with the outer housing removed and the end plate is in phantom (dashed or dotted) lines to show the gear train.

FIG. 12 is similar to FIG. 11, but FIG. 12 illustrates a transparent gear housing 84 in phantom lines to illustrate the gear assembly 102. The main gear 78 is attached to the door shaft 56 while the gears 76 from each spring assembly 62 are meshed with the main gear 78 in order to impart torque from the springs 72 from each spring assembly 62 to the main gear 78 and thereby to the door shaft 56.

Figure 13:
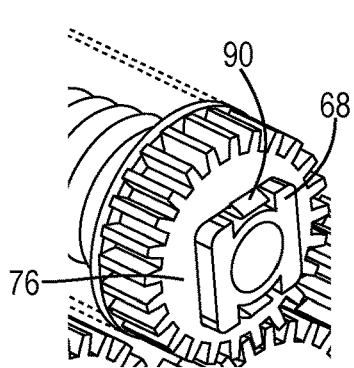
FIG. 13 is a partial perspective view of one end of a spring assembly showing the snap fitting attached to a gear.

FIG. 13 shows a snap fitting type end projection 68. The end projection 68 extends through and attaches to a gear 76. The snap fitting end type end projection 68 includes a snap tab 90. The snap tab 90 is flexible to retract so as to be able to move through a hole in the gear 76 and then move out (or snap) outwardly to engage the gear 76 and secure the gear 76 to the end projection 68. The end projection 68 has an outer shape to correspond with a hole in the gear 76 to resist the gear 76 and end projection 68 from sliding with respect to each other. In the embodiment shown in FIG. 13 the outer shape of the end projection 68 is square, but other embodiments may user other shapes.

Figure 14:
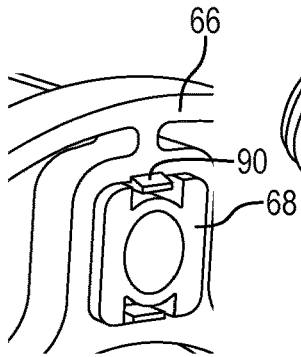
FIG. 14 is a partial perspective view of one end of a spring assembly showing the snap fitting attached to an end plate.

FIG. 14 shows a snap fitting type end projection 68. The end projection 68 extends through and attaches to an end plate. The end projection 68 that attaches to an end plate 66 would typically be on an opposite end than the end of a spring assembly 62 that attaches to a gear 76. The snap fitting end type end projection 68 includes a snap tab 90. The snap tab 90 is flexible to retract so as to be able to move through a hole in the end plate 66 and then move out (or snap) outwardly to engage the end plate 66 and secure the end plate 66 to the end projection 68. The end projection 68 has an outer shape to correspond with a hole in the end plate 66 to resist the end plate 66 and end projection 68 from sliding with respect to each other. In the embodiment shown in FIG. 14 the outer shape of the end projection 68 is square, but other embodiments may user other shapes.

Figure 15:
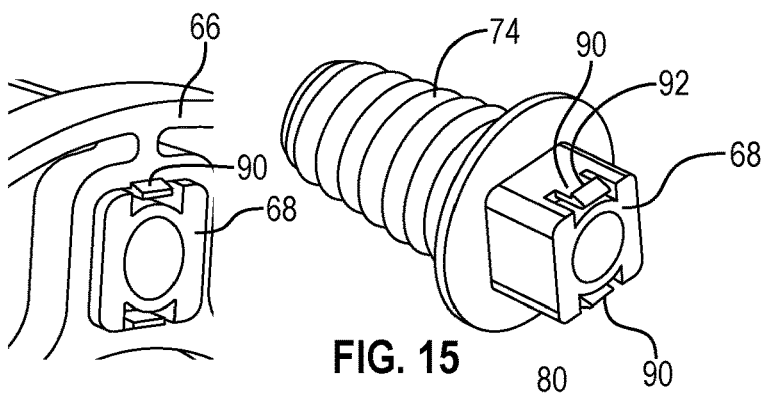
FIG. 15 is a perspective view of an end plug.
Figure 16:
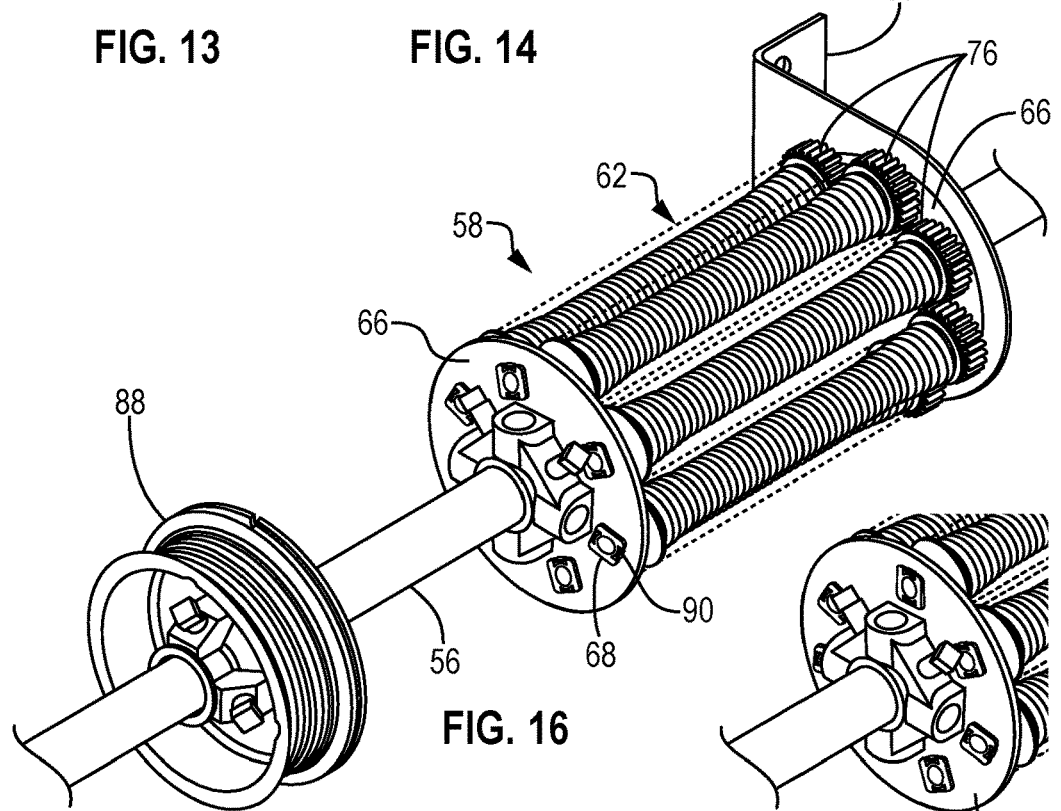
FIG. 16 is a perspective view of a counterbalance system.
Figure 17:
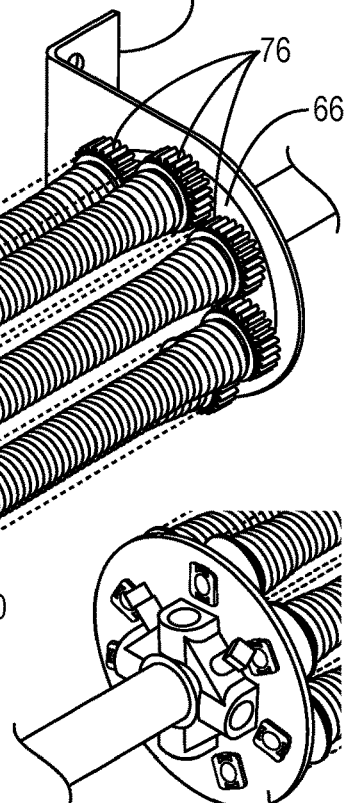
FIG. 17 is a partial perspective view of one end of a spring assembly showing the snap fitting attached to an end plate.
Figure 18:
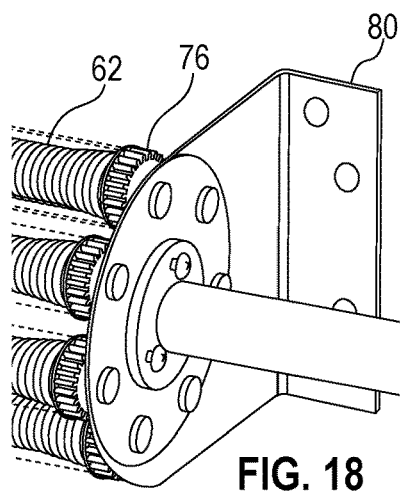
FIG. 18 is a partial perspective view of one end of a spring assembly showing an alternate fitting attached to an end plate.
Figure 19:
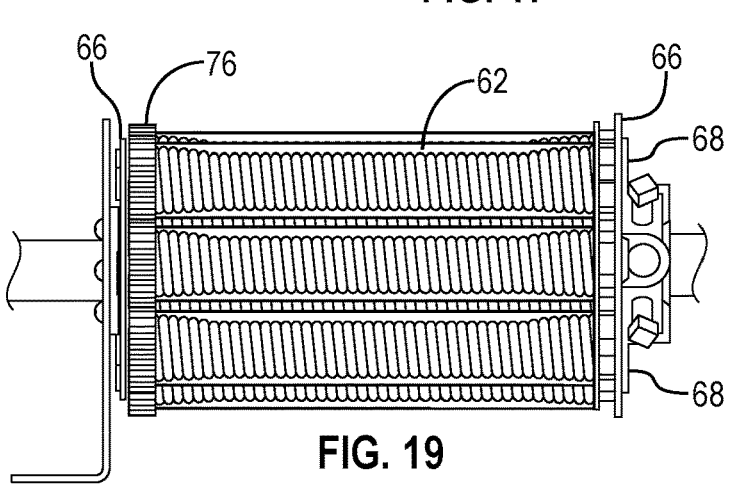
FIG. 19 is a front view of one end of a spring assembly.

FIG. 15 shows an end plug 74 equipped with a snap fit type of end projection 68 such as used in the embodiments of FIGS. 13 and 14. The snap tabs 90 are shown as well as (one of) the hook surfaces 92 that are used to engage the gear 76 or end plate 66.

FIGS. 16, 17, 18, and 19 show a counter balance system 58 where snap fitting type end projections 68 are used to attach the spring assemblies 62 to the end plates 66 and gears 76 and mounting bracket 80. The door shaft 56 and cable drum 88 are also shown.

Figure 20:
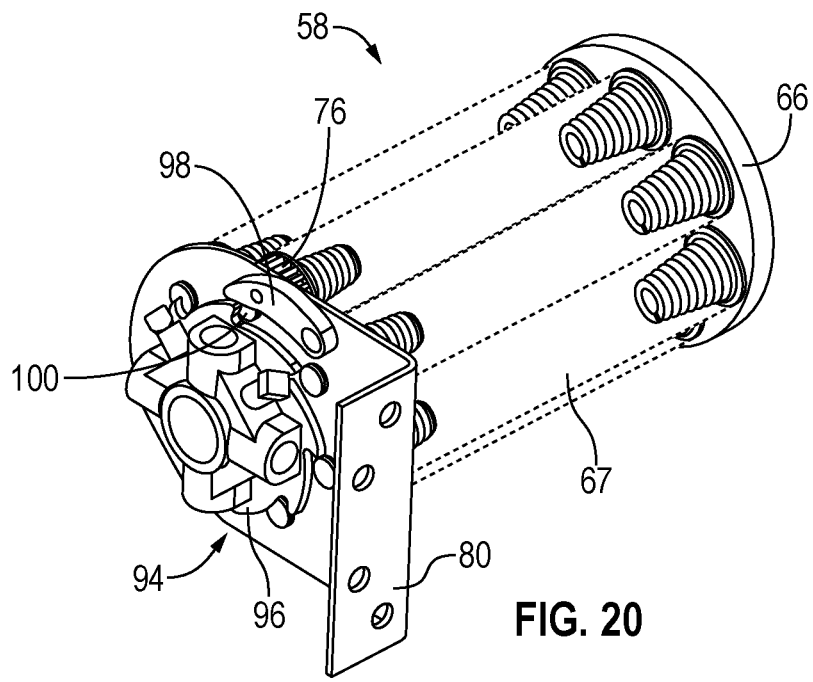
FIG. 20 is a perspective view of a counterbalance system.
Figure 21:
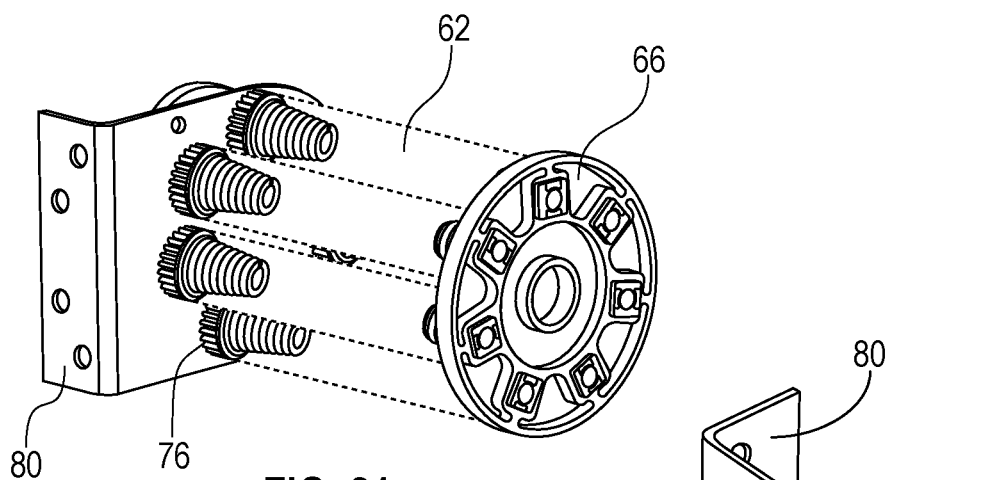
FIG. 21 is a perspective view of a counterbalance system.
Figure 22:
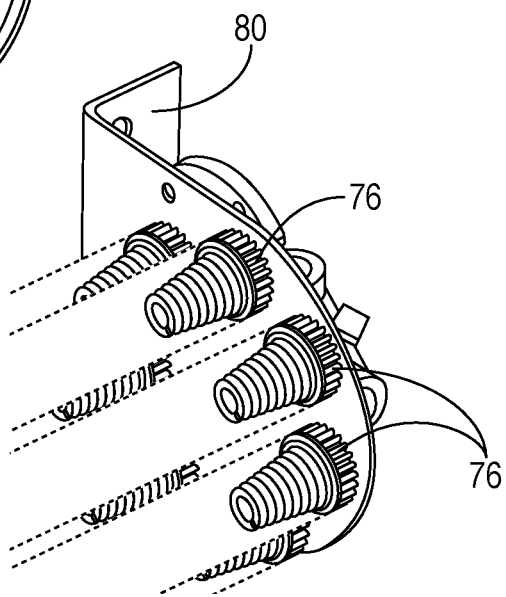
FIG. 22 is a partial perspective view of one end of a counter balance system.

FIGS. 20, 21, and 22 show a counterbalance system 58 that includes a ratchet system 96 for limiting rotation of the spring assemblies 62 in one direction. A ratchet wheel 96 rotates with the spring assemblies 62 and interacts with a pawl 98 via hooks 100 in the ratchet wheel 96. As shown and described with respect to other embodiments, the spring assemblies 62 connect to an end plate 66 at one end and gears 76 at the other end. The counterbalance system 58 is mounted to a mounting bracket 80 for mounting the counterbalance system 58 to a structure such as a wall 59 (see FIG. 9). The ratchet system 94 operates in a similar manner as the ratchet system 94 described in U.S. Pat. No. 6,527,037 which is hereby incorporated by reference in its entirety.

Figure 29:
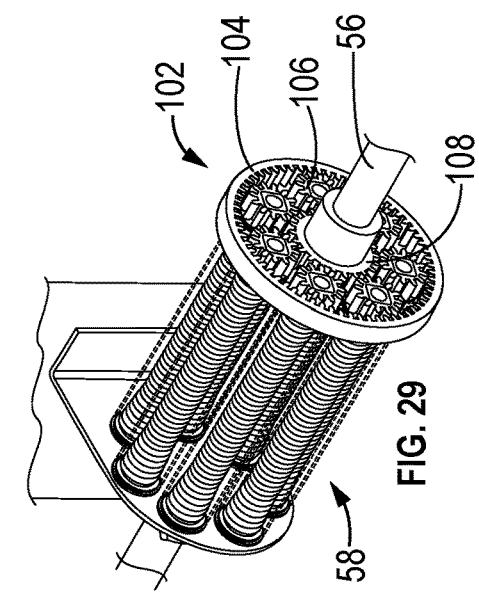
FIG. 29 is a perspective view of a gear train.
Figure 28:
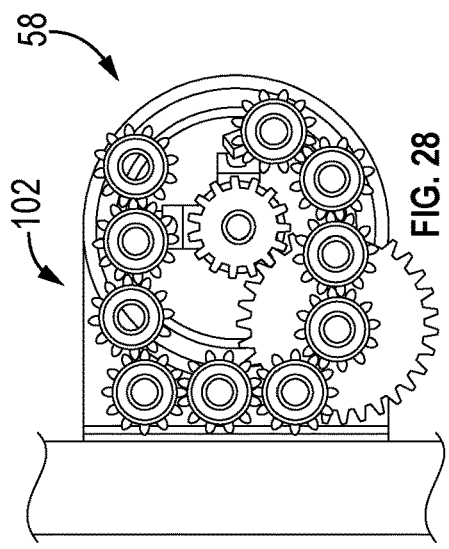
FIG. 28 is a side view of a gear train.
Figure 27:
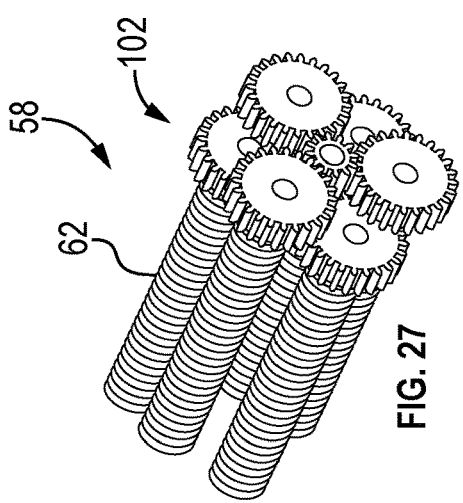
FIG. 27 is a perspective view of a gear train.

FIGS. 23-25 and 27-29 show counterbalance assemblies 58 that have other examples of gear trains 102 (also known as a gear assemblies 102). Different gear trains 102 may be configured to transmit torque from the various spring assemblies 62 to the door shaft 56. As shown in FIG. 29 a planetary gear assembly 102 with a ring gear 104, planet gears 106 and a sun gear 108 may be used. Gear assemblies 102 are well known in the art and will not be described in detail here. It will be understood that one of ordinary skill in the art, after reviewing this disclosure may understand a suitable gear assembly 102 to use for a particular counterbalance assembly 58.

Figure 26:
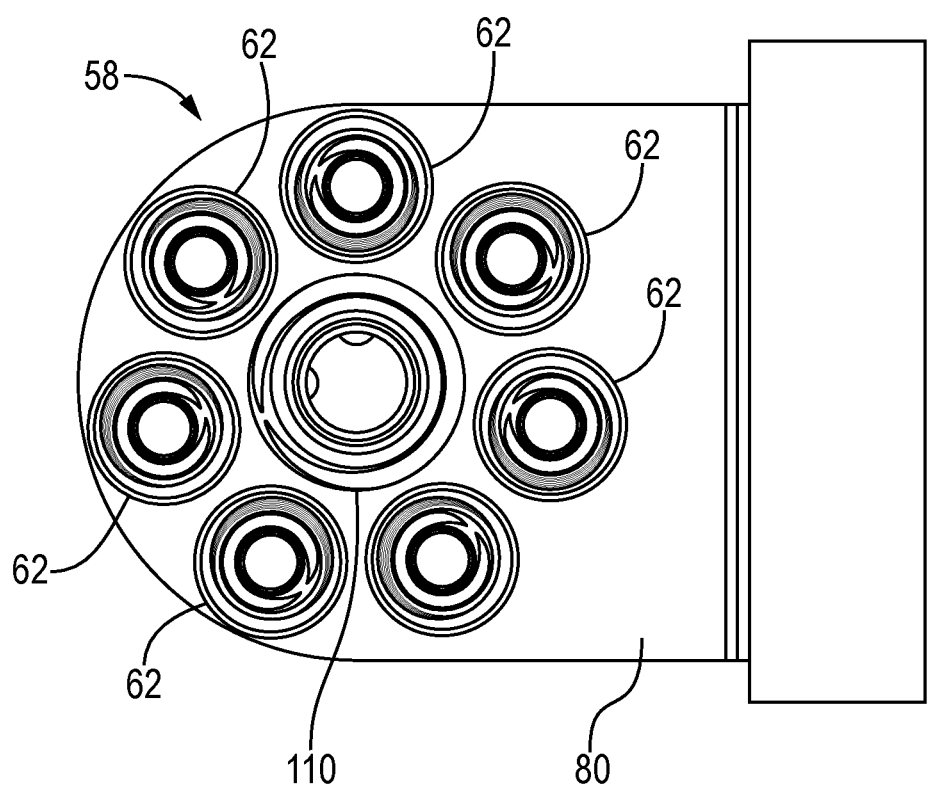
FIG. 26 is a side view of a counter balance system.

FIG. 26 shows a counter balance system 58 mounted to a mounting bracket 80 where a sun spring 110 is used to connect the various spring assemblies 62 and accumulate the torque associated with the various spring assemblies 62.

Arrays of spring assemblies 62 arranged in various ways may be employed to achieve space and torque requirement for a particular installation of a counterbalance assembly. In addition to the arrangements already described herein, FIG. 26 and FIGS. 30-44 illustrate non-limiting examples of arrangements of spring assemblies 62 and gear trains 102 that may be used in accordance with various embodiments of the invention.

While the disclosure has been described in terms of exemplary aspects, those skilled in the art will recognize that the disclosure can be practiced with modifications in the spirit and scope of the appended claims. These examples given above are merely illustrative and are not meant to be an exhaustive list of all possible designs, aspects, applications or modifications of the disclosure.

We claim:

1. A system for exerting torque on a shaft comprising:
    a spring assembly having;
        a spring;
        a companion member to the spring, wherein at least one of the spring and the companion member is in compression and the other of the spring and companion member is in tension;
        connecting structure for transmitting a force associated with the spring outside of the spring assembly; and
    a gear train for connecting the connecting structure to the shaft to apply torque to the shaft.

2. The system of claim 1, wherein the spring assembly is connected to a sun spring.

3. The system of claim 1, further comprising an end plate located at an end of the spring and the connecting structure attaches to the end plate with a snap fitting.

4. The system of claim 3, wherein the snap fitting includes a resilient hook urging against a structure defining a hole in the end plate.

5. The system of claim 1, wherein the spring assembly further comprises a plurality of spring assemblies located proximate to the shaft and connected to the shaft via the gear train to impart torque on the shaft.

6. The system of claim 5, wherein the plurality of spring assemblies are located in an array about the shaft.

7. The system of claim 6, wherein the plurality of spring assemblies are located in an annular array about the shaft.

8. The system of claim 1, further comprising an upward acting door operatively connected to the shaft such that when the shaft rotates in one direction the door moves to an open position and when the shaft rotates in the other direction the door moves to a closed position.

9. The system of claim 8, wherein the system is a counter balance system for the door.

10. The system of claim 1, wherein the gear train includes a planetary gear system.

11. The system of claim 1, further comprising an end plate located at an end of the spring and a second connecting structure extending through a hole in the end plate.

12. A system for exerting torque on a shaft comprising:
a plurality of spring assemblies arranged in an array around the shaft, each spring assembly having;
a spring and;
connecting structure for transmitting a force associated with the spring; and
a gear train for connecting the connecting structure to the shaft and configured to apply the force associated with the spring to the shaft in the form of torque on the shaft.

13. The system of claim 12, further comprising an outer casing for each spring, the outer casing for each spring housing the spring, wherein at least one of the spring and outer casing is in compression and the other of the spring and outer casing is in tension.

14. The system of claim 13, wherein each spring assembly contains an end plate located at an end of the outer casings and springs and the connecting structures extend through the end plate.

15. The system of claim 14, wherein the connecting structures attach to the end plates via a snap fit system.

16. The system of claim 12, further including an upward acting door attached to the shaft and counterbalanced by the plurality of spring assemblies.

17. A method of exerting torque on a shaft comprising:
arranging a plurality of spring assemblies arranged in an array around the shaft, each spring assembly having;
a spring and;
connecting structure for transmitting a force associated with the spring;
attaching a gear train to the connecting structure; and
configuring the gear train to apply the force associated with the spring to the shaft in the form of torque on the shaft.

18. The system of claim 17, wherein each spring assembly contains an end plate located at an end of the springs and the connecting structures extend through the end plate.

19. The system of claim 18, using a snap fit connection to connect the connecting structures to the end plate.

20. The system of claim 17, further connecting an upward acting door to the shaft and counterbalancing the door with the plurality of spring assemblies.

* * * * *